(12) United States Patent
Roblek et al.

(10) Patent No.: US 9,390,719 B1
(45) Date of Patent: Jul. 12, 2016

(54) INTEREST POINTS DENSITY CONTROL FOR AUDIO MATCHING

(71) Applicants: Dominik Roblek, Mountain View, CA (US); Matthew Sharifi, Zurich (CH)

(72) Inventors: Dominik Roblek, Mountain View, CA (US); Matthew Sharifi, Zurich (CH)

(73) Assignee: Google Inc., Mountain View, CA (US)

( * ) Notice: Subject to any disclaimer, the term of this patent is extended or adjusted under 35 U.S.C. 154(b) by 706 days.

(21) Appl. No.: 13/648,108

(22) Filed: Oct. 9, 2012

(51) Int. Cl.
| | |
|---|---|
| *G06F 17/00* | (2006.01) |
| *G10L 19/022* | (2013.01) |
| *G06F 17/30* | (2006.01) |
| *G10L 19/025* | (2013.01) |
| *G10L 19/26* | (2013.01) |

(52) U.S. Cl.
CPC ........ *G10L 19/022* (2013.01); *G06F 17/30743* (2013.01); *G10L 19/025* (2013.01); *G10L 19/26* (2013.01)

(58) Field of Classification Search
None
See application file for complete search history.

(56) References Cited

U.S. PATENT DOCUMENTS

| | | | |
|---|---|---|---|
| 2009/0265174 A9* | 10/2009 | Wang | G06K 9/00536 704/273 |
| 2012/0317241 A1* | 12/2012 | Wang | 709/219 |
| 2014/0310006 A1* | 10/2014 | Anguera Miro et al. | 704/500 |

* cited by examiner

*Primary Examiner* — Fan Tsang
*Assistant Examiner* — David Siegel
(74) *Attorney, Agent, or Firm* — Fenwick & West LLP (57) ABSTRACT

Systems and methods are provided herein relating to audio matching. The density and quality of interest points can be controlled to assure a small but uniform number of high quality interest points. By scoring interest points based on quality and comparing them over time, those interest points that maintain a high quality when compared with a varying number of neighboring interest points can be retained, while those interest points that do not maintain a high quality can be discarded. Thus, the scalability of an audio matching system can be improved while retaining accuracy.

24 Claims, 11 Drawing Sheets

INTEREST POINTS DENSITY CONTROL FOR AUDIO MATCHING

TECHNICAL FIELD

This application relates to audio matching, and more particularly to controlling interest point density while maintaining quality of interest points.

BACKGROUND

Audio matching provides for identification of a recorded audio sample by comparing an audio sample to a set of reference samples. One example of a recorded audio sample can be an audio track of a video. To make the comparison, an audio sample can be transformed to a time-frequency representation of the sample (e.g., by using a short time Fourier transform (STFT)). Using a time-frequency representation, interest points that characterize time and frequency locations of peaks or other distinct patterns of the spectrogram can be extracted from the audio sample. Descriptors can be computed as functions of sets of interest points. Descriptors of the audio sample can then be compared to descriptors of reference samples to determine identity of the audio sample.

In a typical descriptor audio matching system, interest points uniquely characterize an audio signal; thus, there is likely little overlap between interest points of two different segments of the audio sample. Pitch-shifting can affect an audio sample by shifting frequency of interest points. For example, when trying to match audio played on radio, television, or in a remix of a song, speed of the audio sample may be slightly changed from the original. Samples that have altered speed will also likely have an altered pitch. Even a small pitch shift that is hard to notice for listeners may present difficult challenges in matching pitch shifted signal due to interest points being altered from the pitch shift. In addition to pitch shifts, other distortions can be present in an audio signal, e.g., distortions related to a noisy environment where the audio signal was captured, distortions related to a very quiet audio signal, distortions caused by a microphone that captured the audio signal, distortions related to equalization problems, etc. Thus, interest points that do not change in presence of distortion are desirable.

In addition, if there are too many interest points generated for a finite audio sample, the scalability of an audio matching system can be negatively impacted. For example, typically as the amount of interest points generated increases, the amount of descriptors generated increases as well. If additional descriptors are generated for each audio sample within a reference index, the size of the reference index can get too large. However, if there is not enough interest points generated for a finite audio sample, or the interest points generated are not of sufficient quality, accuracy of an audio matching can be negatively impacted. Thus, to increase scalability while maintaining accuracy, it is desirable to have a small, but uniform number of high quality interest points generated from both the audio sample and the reference sample.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

In accordance with an aspect, an input component receives an audio sample. A spectrogram component generates a spectrogram of the audio sample. An interest point detection component generates a set of interest points based on local maxima over respective time/frequency windows of the spectrogram wherein interest points in the set of interest points are associated with a time and frequency position. A quality component associates a quality score with interest points in the set of interest points. An interest point filter component filters the set of interest points based on the quality score associated with the interest points in the set of interest points and a desired density.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

Audio matching in general involves analyzing an audio sample for unique characteristics that can be used in comparison to unique characteristics of reference samples to identify the audio sample. As a starting point for this analysis, a spectrogram of the audio signal can be constructed. A spectrogram represents an audio sample by plotting time on one axis and frequency on another axis. Additionally, amplitude or intensity of a certain frequency at a certain time can also be incorporated into the spectrogram by using color or a third dimension.

There are several different techniques for creating a spectrogram. One technique involves using a series of band-pass filters that can filter an audio sample at one or more specific frequencies and measure amplitude of the audio sample at that specific frequency over time. The audio sample can be run through additional filters to individually isolate a set of frequencies to measure the amplitude of the set over time. A spectrogram can be created by combining respective measurements over time on a frequency axis to generate a spectrogram image of frequency amplitudes over time.

A second technique involves using the short-time Fourier transform ("STFT") to break down an audio sample into time windows, where respective windows are Fourier transformed to calculate magnitude of the frequency spectrum for the duration of each window. Combining a plurality of windows side by side on a time axis of the spectrogram creates an image of frequency amplitudes over time. Other techniques, such as wavelet transforms, can also be used to construct a spectrogram.

Creating and storing in a database an entire spectrogram for a plurality of reference samples can use large amounts of storage space and affect the scalability of an audio matching system. Therefore, it can be desirable to instead calculate and store compact descriptors of reference samples versus an entire spectrogram. One method of calculating descriptors is to first determine individual interest points that identify unique characteristics of local features of the time-frequency representation of the reference sample. Descriptors can then be computed as functions of sets of interest points.

Interest points should uniquely characterize the audio signal. For example, there should be little overlap between interest points of two different segments of audio. In addition, interest points should not change in presence of distortion. If there are too many interest points generated for a finite audio sample, the scalability of an audio matching system can be negatively impacted. For example, typically as the amount of interest points generated increases, the amount of descriptors generated increases as well. If additional descriptors are generated for each audio sample within a reference index, the size of the reference index can get too large. However, if there is not enough interest points generated for a finite audio sample, or the interest points generated are not of sufficient quality, the accuracy of an audio matching can be negatively impacted.

Systems and methods herein provide for generating a set of interest points based on a spectrogram of an audio sample, wherein interest points can be, for example, local maxima over respective time/frequency windows of the spectrogram. Interest points can be characterized by time and frequency position of the interest point. An additional quality score can be generated for each interest point. For example, magnitude in the spectrogram of respective interest points can be a basis for quality score. A quality score can have a positive correlation with the likelihood that an interest point would not change in the presence of distortion. Interest points can then be filtered based on the quality score and a desired density. In one implementation, a distribution threshold can be used to maximize distribution throughout an audio sample of filtered interest points.

Figure 1A:
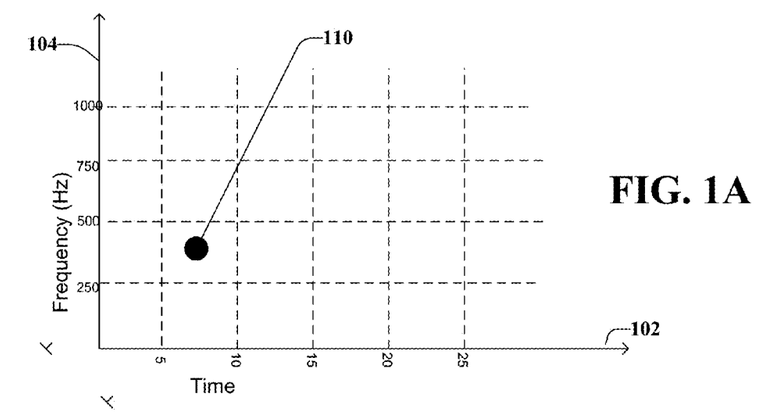
FIG. 1A illustrates an example time frequency plot of time/frequency windows in accordance with implementations of this disclosure.

Referring now to FIG. 1A there is illustrated an example time frequency plot of time/frequency windows in accordance with implementations of this disclosure. FIG. 1 depicts time (units) on a horizontal axis 102 and frequency (Hz) on a vertical axis 104. The windows depicted in FIG. 1A are not overlapping for ease of explanation; however, in most implementations, the windows are not disjoint, and can slide around the spectrogram, for example, growing larger at higher frequencies.

One example of a time/frequency window is the window bordered by time units of five and ten and frequencies of 250 Hz and 500 Hz. Interest point 110 resides within the example time/frequency window. Interest point 110 can be described by its position in both time and frequency dimensions. For example, interest point 110 is located at 375 Hz and at 7 time units. Interest points can be local maxima over respective time/frequency windows of the spectrogram. Thus, interest point 110, in this example, is a local maxima within a time/frequency window. It can be appreciated that by adjusting the size of the time/frequency windows used to generate interest points, more or less points can be generated by reducing or increasing the size of the time/frequency windows respectively. For example, the smaller the window, the more points would be recognized as local maxima, as there are more windows.

In addition to a time and frequency position, interest points can also be characterized by at least one additional quantitative property or quality score. The quality score can have positive correlation with likelihood that the interest point would not change in presence of distortion. One example of a quality score is a locally normalized magnitude. Locally normalized magnitude is calculated as the magnitude of the local maxima divided by the average magnitude in a time/frequency window surrounding the local maxima. It can be appreciated that the greater the magnitude of the maxima as compared to the surrounding window, the more likely the point will not change in presence of distortion. It can be further appreciated that other quantitative properties can be used as the quality score, such as, for example, raw magnitude.

Figure 1B:
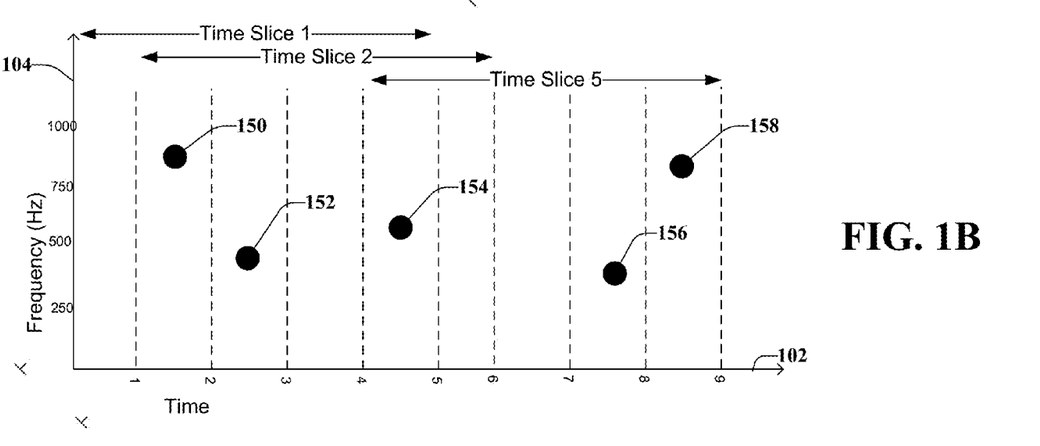
FIG. 1B illustrates an example time frequency plot of time slices in accordance with implementations of this disclosure.

Referring now to FIG. 1B there is illustrated an example time frequency plot of time slices in accordance with implementations of this disclosure. As stated above, generating a set of interest points that are small, but uniform, and of high quality, can both aid in scalability of an audio matching system as well as accuracy. One way to filter a set of generated interest points containing a quality score is to retain only those interest points, that when ordered by quality score, appear among top detected interest points within a certain number of consecutive time slices.

As referred to supra with regards to FIG. 1A, consecutive overlapping time/frequency windows can be used to generate interest points. A distribution threshold can be established whereby interest points that maintain a high quality score within "M" (where M is an integer) consecutive time slices, are retained while those interest points that do not meet such threshold are filtered. To judge whether an interest point maintains a high quality score, a quality ranking can be established wherein interest points should appear among the top "N" (where N is an integer) detected interest points in the string of M consecutive time slices. It can be appreciated that by changing M and N parameters (e.g., the distribution threshold and the quality ranking) the density, distribution and quality of interest points can be more effectively controlled. It can be further appreciated that adjusting the size of time/frequency windows during interest point detection can also effect density as well.

Interest points 150, 152, 154, 156 and 158 populate various parts of the first 9 time units of the time frequency plot depicted in FIG. 1B. Time slices 1, 2 and 5 are also depicted. In the example plot, each time slice is 5 time units in length: Time Slice 1 covers from zero time units to five time units. Time Slice 2 covers one time units to six time units. Within Time Slice 1, interest point 154 has the highest quality score followed by interest point 152 with interest point 150 having the third highest quality score. For ease of explanation, only the top three points for each time slice are depicted. It can be appreciated that the quality ranking can be higher than three. Within Time Slice 2, the same three points (interest points 154, 152 and 150) are the top three points in the same order as the same three points reside within Time Slice 2 and additional interest points included between time unit five and time unit six did not have a high enough quality score to be greater than interest points 154, 152, and 150 respectively. Within Time Slice 5, interest point 154 remains the top point; however, interest point 156 is the second highest point and interest point 158 is the third highest point. It can be appreciated that interest points 150 and 152 are not within Time Slice 5 and therefore are not compared with interest points 156 and 158 to determine the top points within Time Slice 5.

In an example where the distribution threshold (e.g., M) is 2 and the quality ranking (e.g., N) is 3, points 150, 152, and 154 would be retained, as all three points are within the Top 3 Points in 2 consecutive time slices. In another example where the distribution threshold is 5 and the quality ranking is 1, only interest point 154 would be retained, as interest point 154 is the top point within 5 consecutive time slices.

It can be appreciated that the density of interest points, e.g., the number of interest points selected for an audio sample of specific size, is approximately a function of the M and N parameters. This function can be similar to N/M. Thus, a larger N reduces uniformity of the time distance between consecutive interest points and increases the likelihood of time clusters (e.g., locally isolated groups of multiple interest points that are very close to each other in time) in selected interest points. A smaller N/M ratio can increase the average quality of retained interest points. If N and M are both increased so that the overall number of selected interest points remain roughly the same, the average quality of the selected interest points increases.

Figure 2:
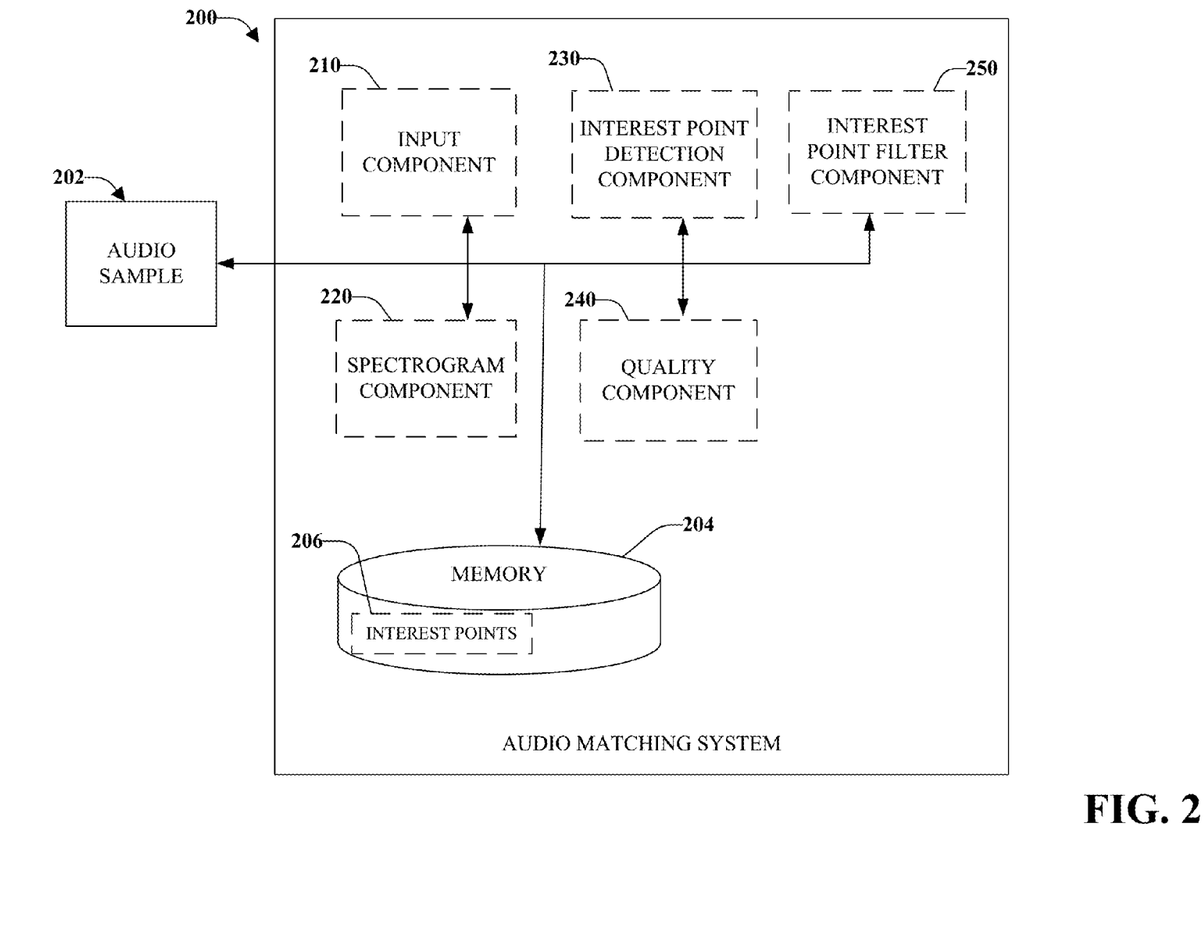
FIG. 2 illustrates a high-level functional block diagram of an example audio matching system in accordance with implementations of this disclosure.

Referring now to FIG. 2, there is illustrated a high-level functional block diagram of an example audio matching system in accordance with implementations of this disclosure. In FIG. 2, an audio matching system 200 includes an input component 210, a spectrogram component 220, an interest point detection component 230, a quality component 240, an interest point filter component 250, and a memory 204, each of which may be coupled as illustrated. Input component 210 can receive an audio sample 202. A spectrogram component 220 can generate a spectrogram of the audio sample. In one implementation, spectrogram component 220 can generate the spectrogram by taking FFTs of half-overlapping windows of the audio signal.

An interest point detection component 230 can generate a set of interest points based on the spectrogram wherein interest points are local maxima over respective time/frequency windows of the spectrogram. Interest points in the set of interest points are associated with time and frequency positions. Interest point detection component 230 can store the set of interest points 206 within memory 204 for access by other components. In another implementation, interest point detection component 330 can adjust the size of respective time/frequency windows based on a desired density. In another implementation, interest point detection component 230 can create variable sizes of time frequency windows. For example, it can be appreciated that by reducing the size of time/frequency windows at lower frequencies, more interest points will be generated at lower frequencies than at higher frequencies.

A quality component 240 can generate and associate a quality score with interest points in the set of interest points. In one implementation, the quality score has a positive correlation with the likelihood the interest point would not change in the presence of distortion. In one implementation, the quality score is based on the magnitude of the interest point compared to the average magnitude over the respective time/frequency window.

Interest point filter component 250 can filter the set of interest points based on the quality score associated with interest points in the set of interest points and the desired density. In one implementation, interest point filter component 250 filters the set of interest points further based on the quality ranking and a distribution threshold. In one implementation, the quality ranking and the distribution threshold are set to maximize quality. In one implementation, the quality ranking and the distribution threshold are set to maximize distribution. It can be appreciated that a wide range of balancing approaches to both quality and distribution are possible by adjusting the quality ranking and the distribution threshold.

Figure 3:
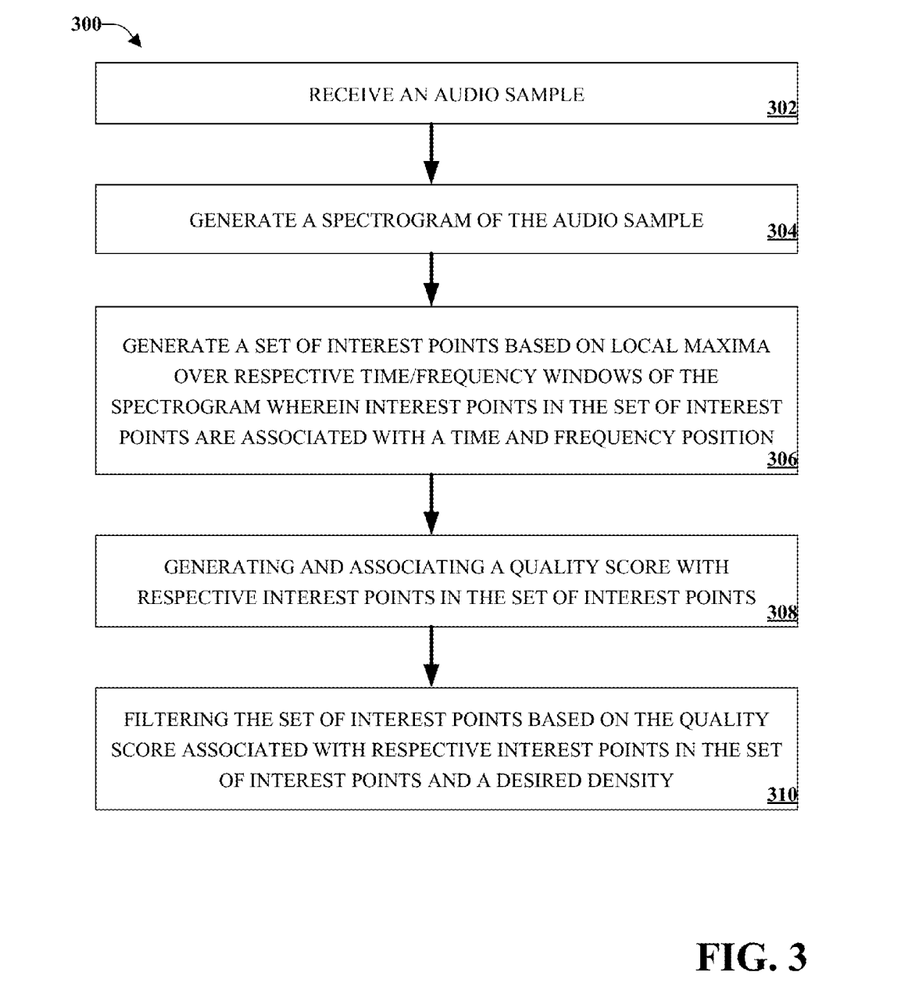
FIG. 3 illustrates an example method for audio matching in accordance with implementations of this disclosure.
Figure 4:
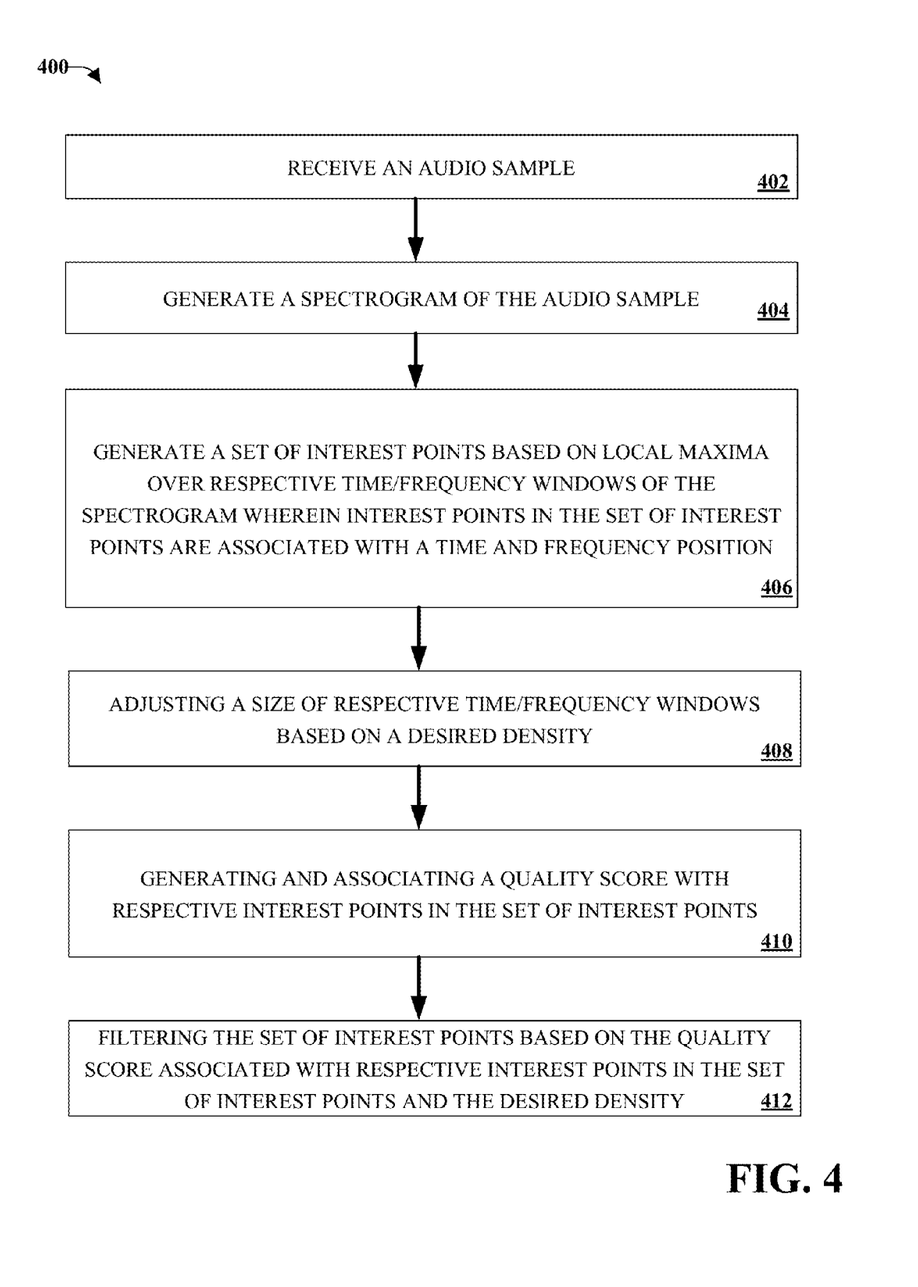
FIG. 4 illustrates an example method for audio matching including adjusting size of time/frequency windows in accordance with implementations of this disclosure.

FIGS. 3-4 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

FIG. 3 illustrates an example method for audio matching in accordance with implementations of this disclosure. At 302, an audio sample can be received (e.g., by an input component 210). At 304, a spectrogram of the audio sample can be generated (e.g., by a spectrogram component 220). At 306, a set of interest points can be generated (e.g., by an interest point detection component 230) based on local maxima over respective time/frequency windows of the spectrogram wherein interest points in the set of interest points are associated with time and frequency positions.

At 308, a quality score can be generated and associated (e.g., by a quality component 240) with respective interest points in the set of interest points. In one implementation, the quality score has a positive correlation with the likelihood that the interest point would not change in presence of distortion. In one implementation, the quality score is based on a magnitude of the interest point compared to an average magnitude over the respective time/frequency window.

At 310, the set of interest points can be filtered (e.g., by an interest point filter component 250) based on the quality score associated with respective interest points in the set of interest points and the desired density. In one implementation, filtering the set of interest points is further based on the quality ranking and the distribution threshold. In one implementation, the quality ranking and the distribution thresholds are set to maximize quality. In one implementation, the quality ranking and the distribution threshold are set to maximize distribution.

FIG. 4 illustrates an example method for audio matching including adjusting the size of time/frequency windows in accordance with implementations of this disclosure. At 402, an audio sample can be received (e.g., by an input component 210). At 404, a spectrogram of the audio sample can be generated (e.g., by a spectrogram component 220). At 406, a set of interest points can be generated (e.g., by an interest point detection component 230) based on local maxima over respective time/frequency windows of the spectrogram wherein interest points in the set of interest points are associated with a time and frequency position.

At 408, the size of respective time/frequency windows can be adjusted (e.g., by an interest point detection component 220) based on a desired density. At 410, a quality score can be generated and associated (e.g., by a quality component 240) with respective interest points in the set of interest points. At 412, the set of interest points can be filtered (e.g., by an interest point filter component 250) based on the quality score associated with respective interest points in the set of interest points and a desired density.

Figure 5:
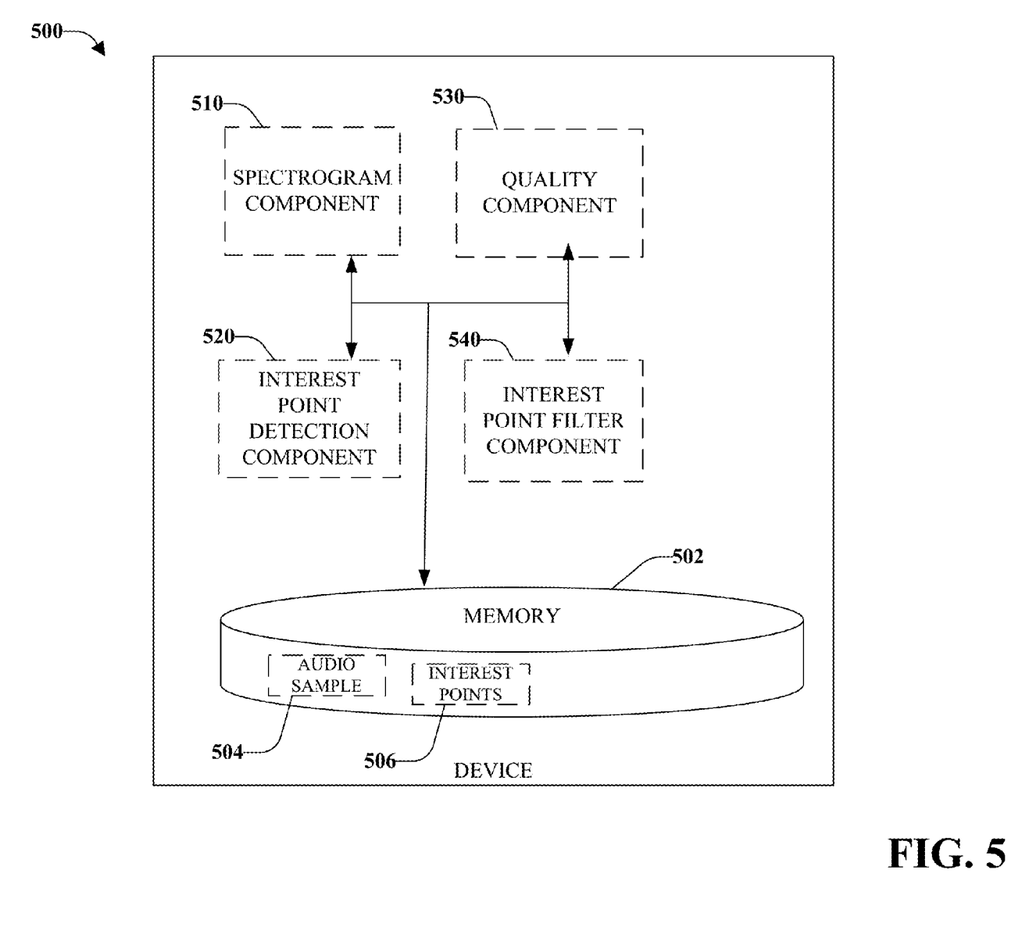
FIG. 5 illustrates a high-level functional block diagram of an example device using audio matching in accordance with implementations of this disclosure.

FIG. 5 illustrates a high-level functional block diagram of an example device using audio matching in accordance with implementations of this disclosure. A device could include a smart phone, a tablet, an e-reader, a personal digital assistant, a desktop computer, a laptop computer, a server, etc. A spectrogram component 510 can generate a spectrogram of an audio sample 504. Audio sample 504 can be an audio file stored within memory 502. In one implementation, spectrogram component 510 can generate the spectrogram by taking FFTs of half-overlapping windows of the audio signal.

Interest point detection component 520 can generate a set of interest points based on local maxima over respective time/frequency windows of the spectrogram wherein interest points in the set of interest points are associated with a time and frequency position. Interest point detection component 520 can store interest points 506 within memory 502 for access by other component. In one implementation, the interest point detection component 520 can adjust a size of respective time/frequency windows based on a desired density Quality component 530 can associate a quality score with interest points in the set of interest points. In one implementation, the quality score has positive correlation with the likelihood that the interest point would not change in the presence of distortion. In one implementation, the quality score is based on the magnitude of the interest point compared to the average magnitude over the respective time/frequency window.

Interest point filter component 540 can filter the set of interest points based on the quality score associated with interest points in the set of interest points and a desired density. In one implementation, the interest point filter component 540 filters the set of interest points further based on a quality ranking and a distribution threshold. In one implementation, the quality ranking and the distribution threshold are set to maximize quality. In one implementation, the quality ranking and the distribution threshold are set to maximize distribution.

Figure 6:
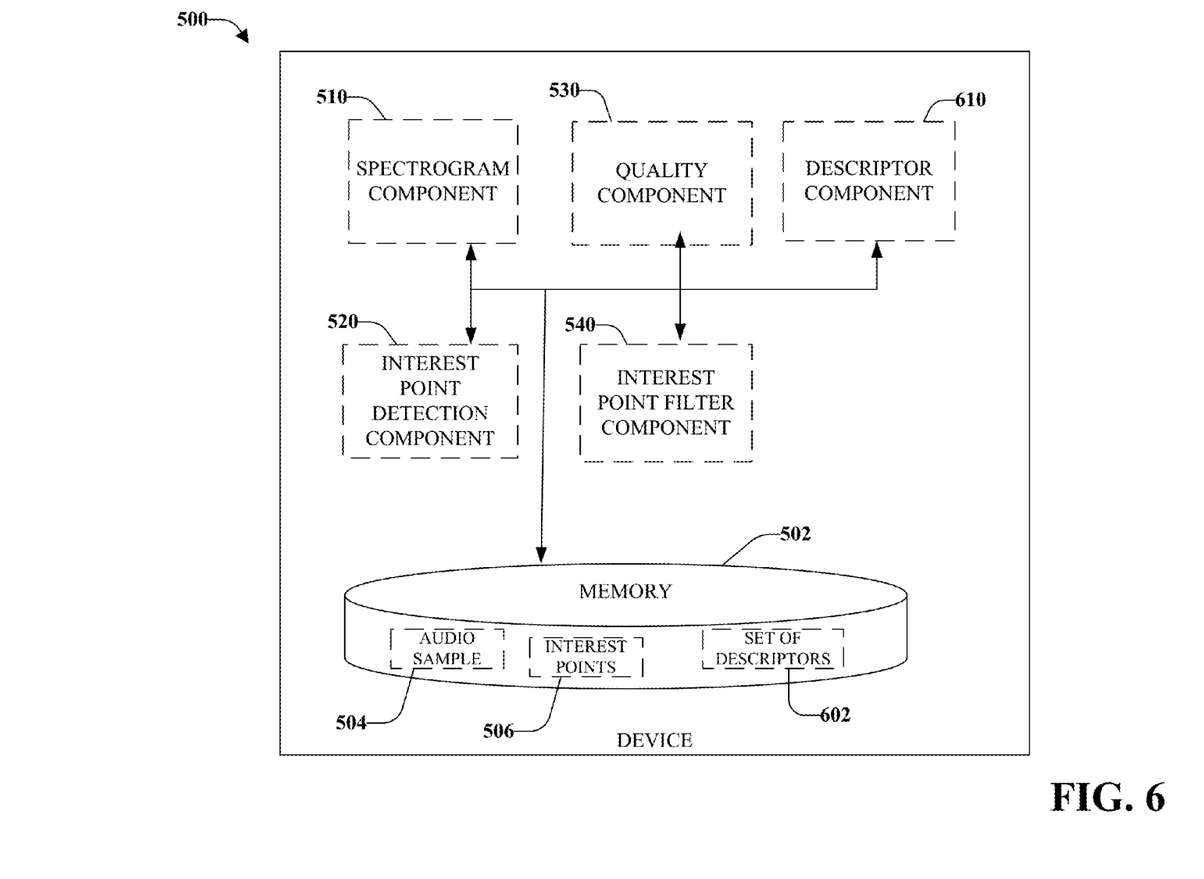
FIG. 6 illustrates a high-level functional block diagram of an example device using audio matching including a descriptor component in accordance with implementations of this disclosure.

FIG. 6 illustrates a high-level functional block diagram of an example client device using audio matching including a descriptor component 610 in accordance with implementations of this disclosure. Descriptor component 610 can generate a set of descriptors for the audio sample based on the set of interest points. In one implementation, descriptor component 610 can further generate and associate metadata with the descriptor wherein metadata includes at least one of desired density, a quality ranking, and a distribution threshold. It can be appreciated that in comparing reference descriptors to the descriptors generated by descriptor component 610, knowing under what parameters the interest points within the descriptor were generated can aid in accurate audio matching. The set of descriptor 602 can be stored within memory 502 for access by other components.

Figure 7:
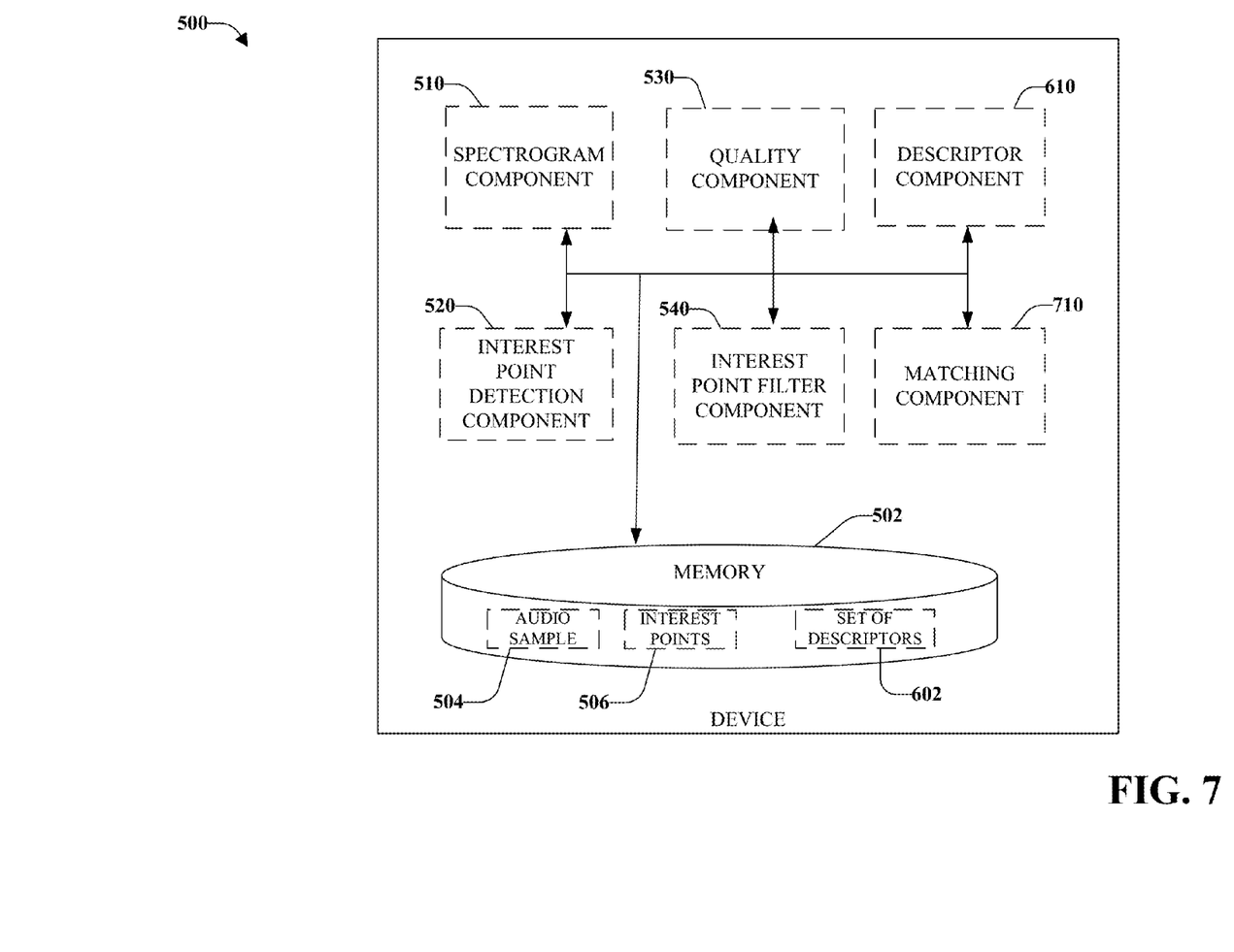
FIG. 7 illustrates a high-level functional block diagram of an example device using audio matching including a matching component in accordance with implementations of this disclosure.

FIG. 7 illustrates a high-level functional block diagram of an example client device using audio matching including a matching component 710 in accordance with implementations of this disclosure. Matching component 710 can identify a set of potential matches based on comparing the descriptors generated by the descriptor component 610 with a set of reference descriptors. For example, all of the information contained within the descriptor can be combined to create a single number. It can be appreciated that in using a single number, locality sensitive hashing ("LSH") style indexing can be used to effectuate the matching.

Figure 8:
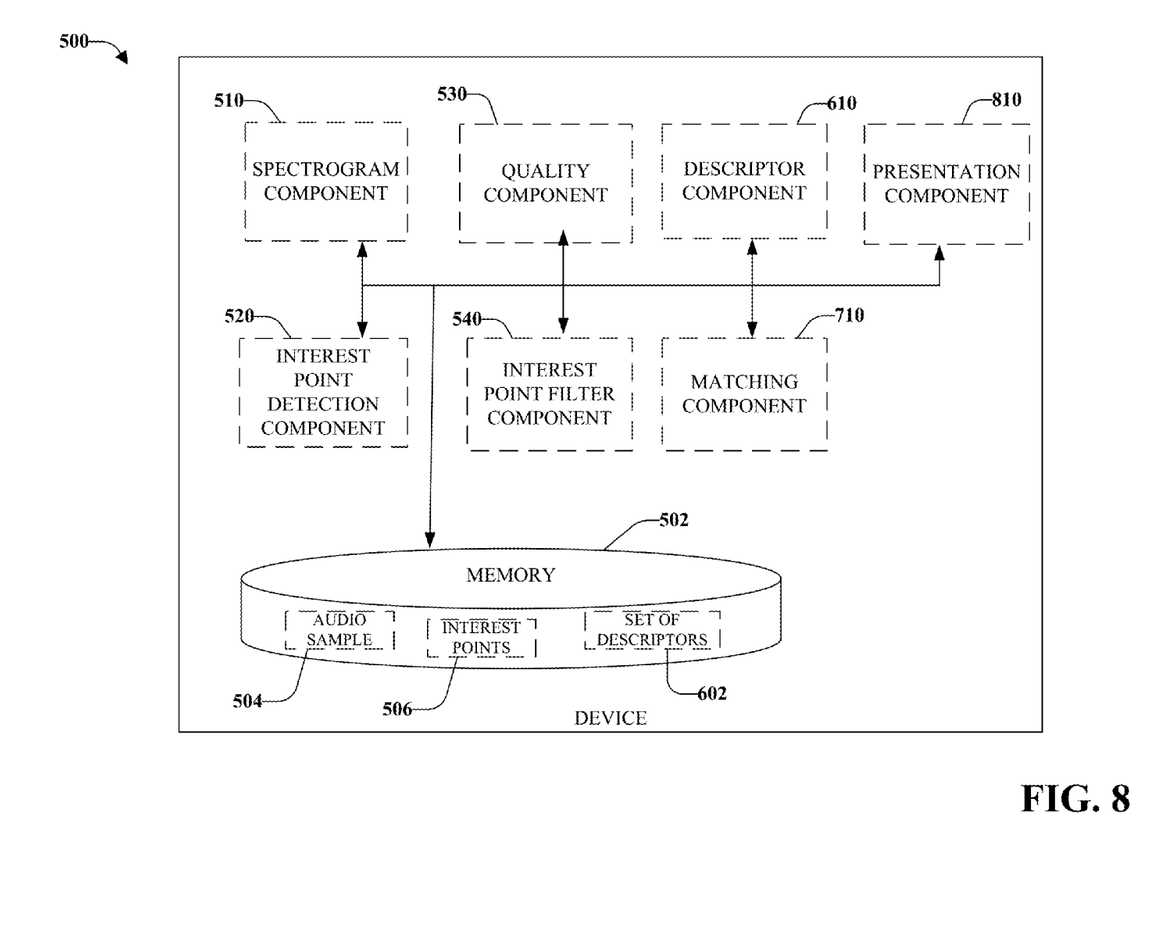
FIG. 8 illustrates a high-level functional block diagram of an example device using audio matching including a presentation component in accordance with implementations of this disclosure.

FIG. 8 illustrates a high-level functional block diagram of an example client device using audio matching including a presentation component 810 in accordance with implementations of this disclosure. Presentation component 810 can display identification of the set of potential matches. For example, presentation component 810 can display metadata associated with the set of matches on the client device, wherein the metadata can include an artist, an album, a year, a genre, etc. associated with the matched audio file. Presentation component can identify that the displayed metadata is associated with the audio sample, by, for example, displaying the name and/or storage location within memory 502 of the audio sample.

Figure 9:
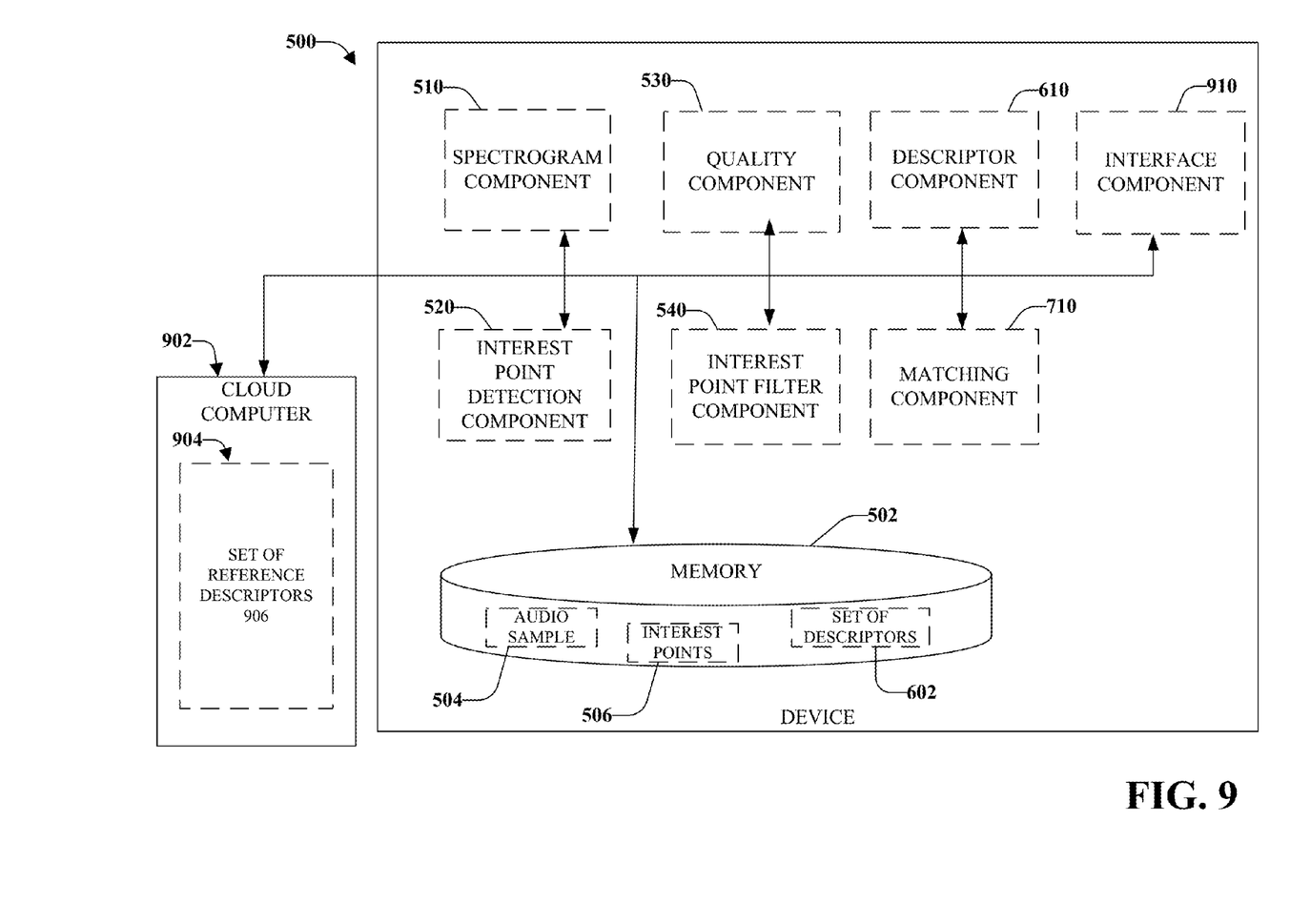
FIG. 9 illustrates a high-level functional block diagram of an example device using audio matching including an interface component in accordance with implementations of this disclosure.

FIG. 9 illustrates a high-level functional block diagram of an example client device using audio matching including an interface component 910 in accordance with implementations of this disclosure. Interface component 910 can communicatively couple the matching component to the set of reference descriptors 602, wherein the set of reference descriptors 906 are located in a cloud computer 902. In one implementation, the matching component 710 can identify the set of potential matches by transmitting the descriptors to the cloud computer 902, wherein the cloud computer 902 can employ the descriptors to identify a set of potential matches based on comparing the descriptors to the set of reference descriptors 906.

In another implementation, interface component 910 can send the audio sample 504 to the cloud computer 902, wherein the cloud computer 902 can generate spectrograms (e.g., by using a spectrogram component 510), generate interest points (e.g., by using an interest point detection component 520), generate quality scores (e.g., by using a quality component 530), filter interest points (e.g., by using an interest point filter component 540), and generate descriptors (e.g., by using a descriptor component 610). Cloud computer 902 can match audio sample 504 by comparing the generated descriptors to the set of reference descriptors 906.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g. generating interest points and/or descriptors); software on a computer readable medium; or a combination thereof.

The aforementioned systems, circuits, modules, and so on have been described with respect to interaction between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Figure 10:
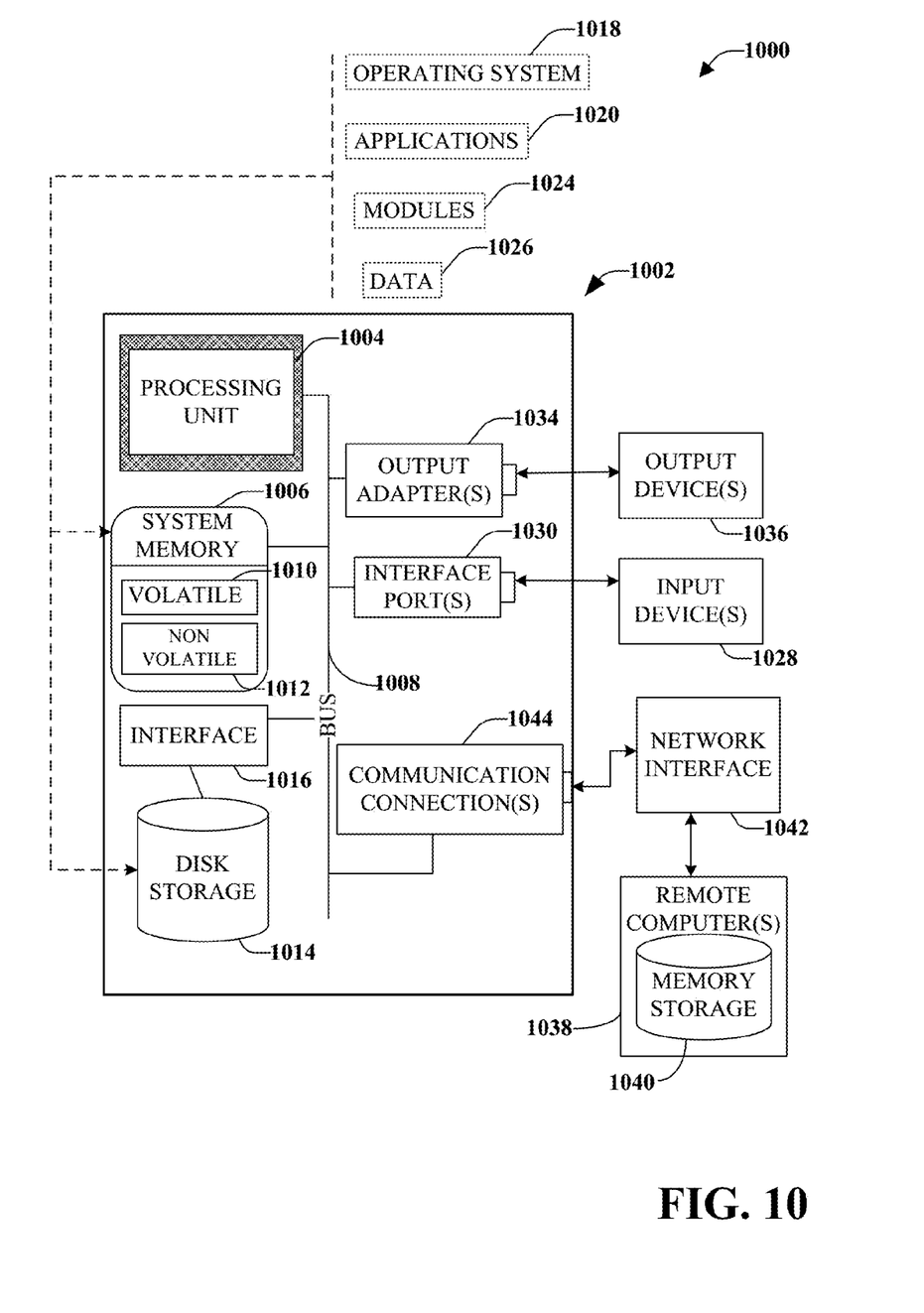
FIG. 10 illustrates an example block diagram of a computer operable to execute the disclosed architecture in accordance with implementations of this disclosure.

With reference to FIG. 10, a suitable environment 1000 for implementing various aspects of the claimed subject matter includes a computer 1002. It is to be appreciated that the computer, 1002 can be used in connection with implementing one or more of the systems or components shown and described in connection with FIGS. 1-4. The computer 1002 includes a processing unit 1004, a system memory 1006, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1006 includes volatile memory 1010 and non-volatile memory 1012. The basic input/output system (BIOS), containing the basic routines to transfer information between elements within the computer 1002, such as during start-up, is stored in non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 1010 includes random access memory (RAM), which acts as external cache memory. According to present aspects, the volatile memory may store the write operation retry logic (not shown in FIG. 10) and the like. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM).

Computer 1002 may also include removable/non-removable, volatile/non-volatile computer storage media. FIG. 10 illustrates, for example, a disk storage 1014. Disk storage 1014 includes, but is not limited to, devices like a magnetic disk drive, solid state disk (SSD) floppy disk drive, tape drive, Jaz drive, Zip drive, LS-100 drive, flash memory card, or memory stick. In addition, disk storage 1014 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016.

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port may be used to provide input to computer 1002, and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

Figure 11:
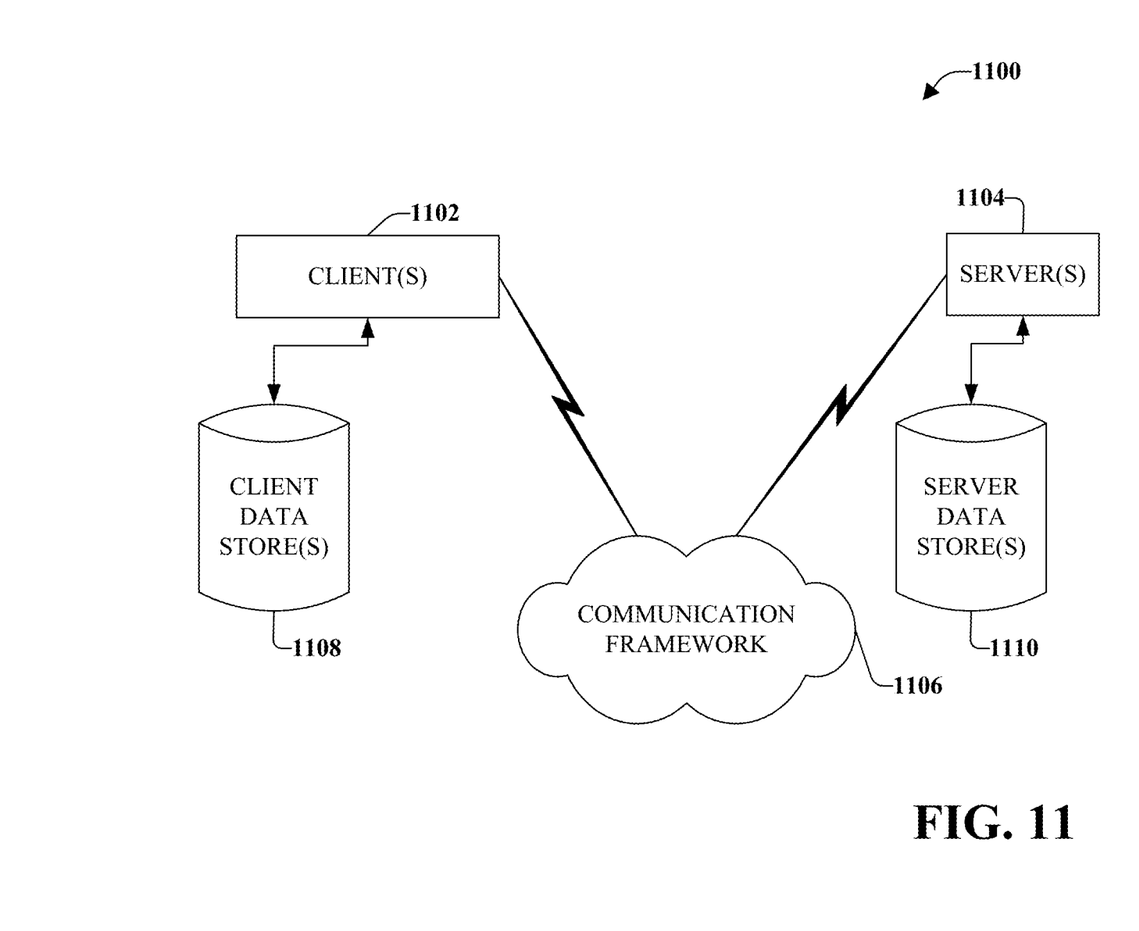
FIG. 11 illustrates an example schematic block diagram for a computing environment in accordance with implementations of this disclosure.

Referring now to FIG. 11, there is illustrated a schematic block diagram of a computing environment 1100 in accordance with the subject specification. The system 1100 includes one or more client(s) 1102, which can include an application or a system that accesses a service on the server 1104. The client(s) 1102 can be hardware and/or software (e.g., threads, processes, computing devices). The client(s) 1102 can house cookie(s), metadata, and/or associated contextual information and can also house threads to perform, for example, receiving an audio sample, generating a spectrogram, identifying interest points of a spectrogram, generating quality scores, filtering interest points, generating descriptors, matching descriptors, etc. in accordance with the subject disclosure.

The system 1100 also includes one or more server(s) 1104. The server(s) 1104 can also be hardware or hardware in combination with software (e.g., threads, processes, computing devices). The servers 1104 can house threads to perform, for example, receiving an audio sample, generating a spectrogram, identifying interest points of a spectrogram, generating quality scores, filtering interest points, generating descriptors, matching descriptors, etc. in accordance with the subject disclosure. One possible communication between a client 1102 and a server 1104 can be in the form of a data packet adapted to be transmitted between two or more computer processes where the data packet contains, for example, an audio sample or descriptors associated with an audio sample. The data packet can include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

The illustrated aspects of the disclosure may also be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present invention. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A system comprising:
    a memory that has stored thereon computer executable components; and
    a processor that executes the following computer executable components stored in the memory:
        an input component that receives an audio sample;
        a spectrogram component that generates a spectrogram of the audio sample;
        an interest point detection component that generates a set of interest points based on local maxima over respective time/frequency windows of the spectrogram, wherein interest points in the set of interest points are associated with time and frequency positions;
        a quality component that generates and associates respective quality scores with interest points in the set of interest points, wherein a quality score for an interest point is based on a magnitude of the interest point compared to an average magnitude of points of a time/frequency window associated with the interest point; and
        an interest point filter component that filters the set of interest points based on the respective quality scores associated with the interest points in the set of interest points and a desired density.

2. The system of claim 1, wherein the quality score has positive correlation with a likelihood that the interest point will not change in presence of distortion.

3. The system of claim 1, wherein the interest point detection component adjusts sizes of the respective time/frequency windows based on the desired density.

4. The system of claim 1, wherein the interest point filter component filters the set of interest points further based on a quality ranking and a distribution threshold.

5. The system of claim 4, wherein the quality ranking and the distribution threshold are set to maximize quality.

6. The system of claim 4, wherein the quality ranking and the distribution threshold are set to maximize distribution.

7. A method comprising:
    receiving, by a system including a processor, an audio sample;
    generating, by the system, a spectrogram of the audio sample;
    generating, by the system, a set of interest points based on local maxima over respective time/frequency windows of the spectrogram, wherein interest points in the set of interest points are associated with a time and frequency position;
    generating and associating, by the system, respective quality scores with interest points in the set of interest points, wherein a quality score for an interest point is based on a magnitude of the interest point compared to an average magnitude of points of a time/frequency window associated with the interest point; and
    filtering, by the system, the set of interest points based on the respective quality scores associated with the interest points in the set of interest points and a desired density.

8. The method of claim 7, wherein the quality score has positive correlation with a likelihood that the interest point will not change in presence of distortion.

9. The method of claim 7, further comprising adjusting sizes of the respective time/frequency windows based on the desired density.

10. The method of claim 7, wherein filtering the set of interest points is further based on a quality ranking and a distribution threshold.

11. The method of claim 10, wherein the quality ranking and the distribution threshold are set to maximize quality.

12. The method of claim 10, wherein the quality ranking and the distribution threshold are set to maximize distribution.

13. A non-transitory computer-readable medium having instructions stored thereon that, in response to execution, cause a system including a processor to perform operations comprising:
    generating a spectrogram of an audio sample;
    generating a set of interest points based on local maxima over respective time/frequency windows of the spectrogram wherein interest points in the set of interest points are associated with a time and frequency position;
    associating respective quality scores with interest points in the set of interest points, wherein a quality score for an interest point is based on a magnitude of the interest point compared to an average magnitude of points of a time/frequency window associated with the interest point; and
    filtering the set of interest points based on the respective quality scores associated with the interest points in the set of interest points and a desired density.

14. The non-transitory computer-readable medium of claim 13, wherein the quality score has positive correlation with a likelihood that the interest point will not change in presence of distortion.

15. The non-transitory computer-readable medium of claim 13, the operations further comprising adjusting sizes of the respective time/frequency windows based on the desired density.

16. The non-transitory computer-readable medium of claim 13, the operations further comprising filtering the set of interest points further based on a quality ranking and a distribution threshold.

17. The non-transitory computer-readable medium of claim 16, wherein the quality ranking and the distribution threshold are set to maximize quality.

18. The non-transitory computer-readable medium of claim 16, wherein the quality ranking and the distribution threshold are set to maximize distribution.

19. The non-transitory computer-readable medium of claim 13, the operations further comprising generating a set of descriptors for the audio sample based on the set of interest points.

20. The non-transitory computer-readable medium of claim 19, the operations further comprising generating and associating metadata with the descriptor, wherein the metadata includes at least one of the desired density, a quality ranking, and a distribution threshold.

21. The non-transitory computer-readable medium of claim 19, the operations further comprising identifying a set of potential matches based on comparing the set of descriptors with a set of reference descriptors.

22. The non-transitory computer-readable medium of claim 21, the operations further comprising identification of the set of potential matches.

23. The non-transitory computer-readable medium of claim 21, wherein the set of reference descriptors are located in a cloud computer.

24. The non-transitory computer-readable medium of claim 23, the operations further comprising identifying the set of potential matches by transmitting the descriptors to the cloud computer, wherein the cloud computer employs the descriptors to identify a set of potential matches based on comparing the descriptors to the set of reference descriptors.

* * * * *